United States Patent
Alibay et al.

(10) Patent No.: US 9,838,572 B2
(45) Date of Patent: Dec. 5, 2017

(54) METHOD AND DEVICE FOR DETERMINING MOVEMENT BETWEEN SUCCESSIVE VIDEO IMAGES

(71) Applicant: STMICROELECTRONICS SA, Montrouge (FR)

(72) Inventors: Manu Alibay, Paris (FR); Stéphane Auberger, Noisy-le-Grand (FR)

(73) Assignee: STMICROELECTRONICS SA, Montrouge (FR)

( * ) Notice: Subject to any disclaimer, the term of this patent is extended or adjusted under 35 U.S.C. 154(b) by 204 days.

(21) Appl. No.: 14/848,962

(22) Filed: Sep. 9, 2015

(65) Prior Publication Data

US 2016/0105590 A1   Apr. 14, 2016

(30) Foreign Application Priority Data

Oct. 9, 2014   (FR) ...................... 14 59675

(51) Int. Cl.
  *H04N 5/14*   (2006.01)
  *H04N 5/232*  (2006.01)
  *G06T 7/246*  (2017.01)
  *G06T 7/277*  (2017.01)

(52) U.S. Cl.
  CPC ............. *H04N 5/145* (2013.01); *G06T 7/246* (2017.01); *G06T 7/277* (2017.01); *H04N 5/23254* (2013.01); *H04N 5/23258* (2013.01); *H04N 5/23277* (2013.01); *G06T 2207/10016* (2013.01)

(58) Field of Classification Search
  CPC ............... H04N 5/145; H04N 5/23254; H04N 5/23258; H04N 5/23277; G06T 7/277; G06T 7/246; G06T 2207/10016

USPC ....................................... 348/208.1
See application file for complete search history.

(56) References Cited

U.S. PATENT DOCUMENTS

| 2010/0232709 | A1* | 9/2010 | Zhang ................. G06T 7/77 382/201 |
| 2011/0211082 | A1* | 9/2011 | Forssen .............. H04N 5/23248 348/208.2 |
| 2012/0281922 | A1* | 11/2012 | Yamada ............. H04N 5/23254 382/201 |

OTHER PUBLICATIONS

David Nister "Preemptive Ransac for Live Structure and Motion Estimations" Machine Vision and Applications Springer Berlin vol. 16 No. 5 Dec. 1, 2005 pp. 321-329.

(Continued)

*Primary Examiner* — Lin Ye
*Assistant Examiner* — Chan Nguyen
(74) *Attorney, Agent, or Firm* — Slater Matsil, LLP

(57) ABSTRACT

The method includes for each current pair of first and second successive video images determining movement between the two images. The determining includes a phase of testing homography model hypotheses on the movement by a RANSAC type algorithm operating on a set of points in the first image and first assumed corresponding points in the second image so as to deliver one of the homography model hypothesis that defines the movement. The test phase includes a test of first homography model hypotheses of the movement obtained from a set of second points in the first image and second assumed corresponding points in the second image. At least one second homography model hypothesis is obtained from auxiliary information supplied by an inertial sensor and representative of a movement of the image sensor between the captures of the two successive images of the pair.

23 Claims, 4 Drawing Sheets

(56) References Cited

OTHER PUBLICATIONS

Han et al "UAV Vision: Feature Base Accurate Ground Target Localization Through Propagated Initializations and Interframe Homographies" International Conference on Robotics and Automation (ICRA) May 14, 2012 pp. 944-950.
Alibay et al "Hybrid Visual and Inertial Ransac for Real-Time Motion Estimation" 2014 IEEE International Conference on Image Processing (ICIP) Oct. 1, 2014 pp. 179-183.
Karpenko et al. "Digital Video Stabilization and Rolling Shutter Correction using Gyroscopes" Stanford Tech Report CTSR Mar. 2011 7 pgs.
Evans et al. "Probabilistic 3-D motion estimation for rolling shutter video rectification from visual and inertial measurements" Department of Electrical an Computer Engineering, The University of Texas as Austin. 6 pgs. Proc. IEEE Multimedia Signal Processing Workshop, Sep. 17-20, 2012, Banff, Canada.
Nister, "Preemptive RANSAC for Live Structure and Motion Estimation" Computer Vision. Proceedings of the Ninth IEEE International Conference on Computer Vision: Oct. 13-16, 2003, 8 pgs.
Elan Dubrofsky, "Homography Estimation" Carleton University, 2007, The University of British Columbia (Vancouver), Mar. 2009. 32 pgs.
Fischler et al., : "Random Sample Consensus: A Paradigm for Model Fitting with Applications to Image Analysis and Automated Cartography," Communications of the ACM, Jun. 1981, vol. 24, No. 6. pp. 381-395.
Michael Calonder et al., 'BRIEF: Binary Robust Independent Elementary Features', ECCV 2010 Proceedings of the 11th European Conference on Computer Vision: Part IV, pp. 778-792.

\* cited by examiner

METHOD AND DEVICE FOR DETERMINING MOVEMENT BETWEEN SUCCESSIVE VIDEO IMAGES

FIELD OF THE INVENTION

Implementations and embodiments of the invention relate to determining movement between successive video images captured by an image sensor (e.g., a video camera), such as one incorporated in a digital tablet or a mobile cellular telephone, for example.

BACKGROUND

Video image sequences can present numerous quality problems. In particular, when the video image sequences are processed by embedded processors, such as those within digital tablets or mobile cellular telephones, quality problems typically arise.

These quality problems include the presence of fuzzy content, unstable content, or distortions due to the rolling shutter effect. The rolling shutter effect induces a distortion in images acquired during a camera movement due to the fact that the acquisition of an image via a CMOS sensor is performed sequentially line-by-line and not all at once.

All these problems are due to movement between successive images. It is therefore necessary to perform an estimation.

The global movement between two successive video images may be estimated via a homography model, typically a 3×3 homography matrix modelling a global movement plane. Typically, homography matrices are estimated between successive images using feature matching between these images. Algorithms for estimating such matrices between successive images are well known to the person skilled in the art and for all useful purposes the latter may refer to the essay entitled "Homography Estimation," by Elan Dubrofsky, B. Sc., Carleton University, 2007, THE UNIVERSITY OF BRITISH COLUMBIA (Vancouver), March 2009.

The RANSAC (abbreviation of Random Sample Consensus) algorithm is well known to the person skilled in the art and is notably described in the article by Fischler et al., entitled "Random Sample Consensus: A Paradigm for Model Fitting with Applications to Image Analysis and Automated Cartography," Communications of the ACM, June 1981, Volume 24, No. 6. The RANSAC algorithm is a robust parameter estimation algorithm used notably in image processing applications. It is used for estimating the global movement between two images by testing a number of homography models.

More precisely, in a first step, a generally minimal set of points in the current image, e.g., a triplet of points, is selected randomly from among all the points (pixels) available in a current image. The assumed corresponding triplet of points in the next image is extracted and from these two triplets a homography matrix representing a movement model hypothesis is estimated.

This model hypothesis thus obtained is then tested on the complete set of image points. More precisely, for at least some of the image points, an estimated point is calculated using the tested model hypothesis. The back-projection error between this estimated point and the assumed corresponding point in the next image is determined.

Points not following the model, i.e., of which the back-projection error is greater than a threshold T, are called outliers. Conversely, the nearby points of the model hypothesis are called inliers and form part of the consensus set. The number thereof is representative of the quality of the estimated model hypothesis.

The preceding two steps (choice of a model hypothesis and test on the set of the points) are repeated until the number of iterations reaches a threshold defined by a formula taking into account the desired percentage of inliers and a desired confidence value. When this condition is true, the model hypothesis that led to this condition is then considered as being the model of the global movement between the two images.

However, the calculation time of the RANSAC type algorithm is very variable and depends notably on the number of points tested and the quality of the points. Indeed, in an easy image, notably displaying numerous feature interest points in the image, the assumed corresponding points will easily be found in the next image. But this will not be the case in a difficult image. This variability in calculation time is generally not compatible with the use of such an algorithm in processors embedded in mobile cellular telephones or digital tablets, for example.

Consequently, in such embedded applications a Pre-emptive RANSAC type algorithm is preferably used, which is well known to the person skilled in the art. The Pre-emptive RANSAC type algorithm is described, for example, in the article by David Nistér, titled "Pre-emptive RANSAC for Live Structure and Motion Estimation," Proceedings of the Ninth IEEE International Conference on Computer Vision (ICCV 2003) 2-Volume Set.

In the Pre-emptive RANSAC algorithm, a set of K homography models, constituting a K model hypotheses to be tested, is first defined from a set of points in the current image (called a hypothesis generator points set) and their matches in the previous image. Typically, K may be between 300 and 500.

Then, all these models are tested, in a similar way to that performed in the conventional RANSAC algorithm, on a first block of image points, e.g., 20 points. At the conclusion of this test, only a portion of the model hypotheses tested is kept, typically those which have achieved the highest scores.

For example, a dichotomy may be performed, i.e., keeping only half of the model hypotheses tested. Then, the remaining model hypotheses are tested using another block of points, and here again, for example, only half of the model hypotheses tested that have obtained the highest scores are kept.

These operations are repeated until all the points are exhausted or a single model hypothesis is finally obtained. In the latter case, this single remaining model hypothesis forms the global model of movement between the two images. In the case where there remain several model hypotheses but more points to be tested, the hypothesis adopted is that with the best score.

However, although the Pre-emptive RANSAC algorithm has certain advantages notably in terms of calculation time, which makes it particularly well suited for embedded applications, and also for parallel processing, movement estimation is less flexible and sometimes not really suitable for extreme cases. Thus, for example, if a person or an object moves in an image field, it may happen that the movement estimator is focused on the person, producing a result that does not match the movement of the camera, which could, for example, provide incorrect video stabilization.

SUMMARY

According to one implementation and embodiment, an improvement is provided in estimating movement between successive video images enabling the quality of the image sequence to be improved, and in particular, in certain specific situations.

According to one aspect, a method is provided for determining movement between successive video images captured by an image sensor. The method includes for each current pair of first and second successive video images (the first and second successive video images of a pair may be typically the previous image and the current image), a determination of movement between these two images. This determination of movement may comprise a phase of testing a plurality of homography model hypotheses of the movement by a RANSAC type algorithm operating on a set of first (test) points in the first image and first assumed corresponding (test) points in the second image so as to deliver the best homography model hypothesis. The best homography model hypothesis defines the movement.

According to a general feature of this aspect, the test phase may include a test of a plurality of first homography model hypotheses of the movement obtained from a set of second points in the first image and second assumed corresponding points in the second image (hypothesis generator points). At least one second homography model hypothesis may be obtained from auxiliary information supplied by at least one inertial sensor and representative of a movement of the image sensor between the captures of the two successive images of the pair.

Thus, according to this aspect, information originating from at least one inertial sensor may be used, e.g., at least one gyroscope, in combination with the visual information for improving the estimation of the movement between two successive images.

Added to the model hypotheses tested by the RANSAC type algorithm is a homography model hypothesis that may be described as inertial, and which is directly determined from the information supplied by the inertial sensor or sensors. The homography model hypothesis may be representative of a movement of the image sensor between the captures of the two successive images.

Thus, for example, the inertial sensor or sensors may be incorporated in the mobile cellular telephone or in the tablet also incorporating the image sensor.

Furthermore, the test for each homography model hypothesis may advantageously take into account a distance between the tested homography model hypothesis and the at least one second homography model hypothesis (i.e., the inertial homography model hypothesis).

In fact, each model hypothesis, whether a first model hypothesis (i.e., a visual model hypothesis) or the second (inertial) model hypothesis is advantageously processed in the same way by the RANSAC type algorithm.

As will be seen in more detail below, a score will be assigned to each model hypothesis. This score may advantageously be corrected by taking into account the distance.

Of course, when testing the second model hypothesis (the inertial model hypothesis), the distance may be zero. Accordingly, the score obtained by this inertial model on the basis of matching points between the first image and the second image may be is corrected with a zero correction, which amounts to not correcting the same.

Although a conventional RANSAC type algorithm may be used, it may be particularly advantageous to use a Pre-emptive RANSAC type algorithm, notably for embedded applications with constraints in terms of calculation time.

The set of first (test) points to which the test phase of the RANSAC type algorithm will be applied and the set of second (hypothesis generator) points from which the first homography model hypotheses are determined, may or may not intersect.

The points of these two sets may be advantageously interest points of this image, i.e., easily recognizable feature points from one image to another.

According to one implementation in which the Pre-emptive RANSAC type algorithm is applied, triplets may be drawn at random from the set of second points for generating a certain number of homography candidates (hypotheses). The set of first (test) points may be grouped by blocks which will be progressively tested by the Pre-emptive RANSAC type algorithm. As indicated above, the set of second (hypothesis generator) points may or may not intersect with the set of test points. These sets of points may advantageously be obtained by random draws.

Even though it may be sufficient to use a gyroscope for supplying inertial type auxiliary information, it may be preferable to use, in addition to a gyroscope, at least another inertial sensor in the group formed by one or more accelerometers and a magnetometer. The accelerometer may be a triaxial accelerometer or three accelerometers placed along perpendicular axes. The accelerometer may thus give an indication of gravity while the magnetometer can be used to obtain an indication of orientation since it provides an estimated direction of north.

According to one implementation, the test for each homography model hypothesis, whether a first homography model hypothesis (visual hypothesis) or a second homography model hypothesis (inertial hypothesis), may include for each first point of at least one block of the set of first points of the first image the following. A first estimated point in the second image is determined from the tested homography model hypothesis. A position difference between the first estimated point and the first assumed corresponding point in the second image is determined. A first piece of score information is determined from the position differences obtained and an error tolerance. The first piece of score information is corrected with a corrective element comprising a first coefficient taking into account the distance between the tested model hypothesis and the second model hypothesis so as to obtain a second piece of score information. This second piece of score information may be used for the determination of the best homography model hypothesis.

The determination of the corrective element may also include a weighting of the first coefficient by a weighting coefficient representative of a weight of the first piece of score information associated with the at least one second homography model hypothesis with respect to the first piece of score information associated with the tested homography model hypothesis.

This weighting coefficient may have a fixed and identical value for all the tested homography model hypotheses of all the image pairs. If the value of this weighting coefficient is too high, then too much importance will be given to the inertial model, but not enough importance if the weighting coefficient is too low.

A fixed and constant value equal to 1 may be a good compromise. However, as a variation, the weighting coefficient may have a fixed and identical value for all the tested homography model hypotheses of the current pair of images. But this value may be calculated at each new current pair of images. Furthermore, the calculation of this value may be performed from all the values of respective distances between the tested homography model hypotheses of the current pair of images and the second homography model hypothesis. The determination of the corrective element may also take into account the number of second points.

According to another aspect, a device is provided for determining movement between successive video images. The device may include input means or an input configured for receiving image signals relating to video images successively captured by an image sensor, and processing means or a processor configured for performing, for each current pair of first and second successive video images, a determination of movement between these two images. The processing means may comprise test means or a test module configured for testing a plurality of homography model hypotheses of the movement by a RANSAC type algorithm operating on a set of first points in the first image and first assumed corresponding points in the second image so as to deliver the best homography model hypothesis. The best homography model hypothesis defines the movement.

According to a general feature of this other aspect, the device may include auxiliary input means or an auxiliary input configured for receiving auxiliary information from at least one inertial sensor and which is representative of a movement of the image sensor between the captures of the two successive images of the pair. The test means may be configured for testing a plurality of first homography model hypotheses of the movement obtained from a set of second points in the first image and of second assumed corresponding points in the second image, and at least one second homography model hypothesis obtained from the auxiliary information.

The auxiliary input means may be configured for receiving the auxiliary information from at least one gyroscope. According to another embodiment, the auxiliary input means may be configured for receiving the auxiliary information from a gyroscope and from at least one other sensor taken from the group formed by one or more accelerometers and a magnetometer.

The RANSAC type algorithm may be a Pre-emptive RANSAC type algorithm.

The test means may be further configured, when testing each homography model hypothesis, for taking into account a distance between the homography model hypothesis and the at least one second homography model hypothesis. The test means may comprise a test module configured for testing each tested homography model hypothesis.

The test module may include first determination means or a first determination unit configured for determining, for each first point of at least one block of the set of first points in the first image, a first estimated point in the second image from the tested homography model hypothesis. A second determination means or a second determination unit may be configured for determining a position difference between the first estimated point and the first assumed corresponding point in the second image. Third determination means or a third determination unit may be configured for determining a first piece of score information from the position differences obtained and an error tolerance. Calculation means or a calculation unit may be configured for calculating a corrective element comprising a first coefficient taking into account the distance. The Correction means may be configured for performing a correction of the first piece of score information with the corrective element so as to obtain a second piece of score information. The second piece of score information may be used for the determination of the best homography model hypothesis.

The calculation means may be further configured for performing a weighting of the first coefficient by a weighting coefficient representative of a weight of the first piece of score information associated with the at least one second homography model hypothesis with respect to the first piece of score information associated with the tested homography model hypothesis.

The weighting coefficient may have a fixed and identical value for all the tested homography model hypotheses of all the image pairs. According to another embodiment, the weighting coefficient may have a fixed and identical value for all the tested homography model hypotheses of the current pair of images. The calculation means may be configured for calculating this value from all the values of respective distances between the tested homography model hypotheses of the current pair of images and the second homography model hypothesis, and for recalculating this value at each new current pair of images.

The calculation means may advantageously be further configured for also taking into account the number of second points.

According to another aspect, a processing unit is provided, e.g., a microprocessor or a microcontroller, incorporating a device for determining movement as defined above.

According to another aspect, an apparatus is provided, e.g., a mobile cellular telephone or a digital tablet, incorporating an image sensor, at least one inertial sensor, and a processing unit as defined above, coupled to the image sensor and to the at least one inertial sensor so as to be able to receive the image signals and the auxiliary information.

BRIEF DESCRIPTION OF THE DRAWINGS

Other advantages and features of the invention will appear on examination of the detailed description of implementations and embodiments, which are in no way restrictive, and the attached drawings in which.

DETAILED DESCRIPTION

Figure 1:
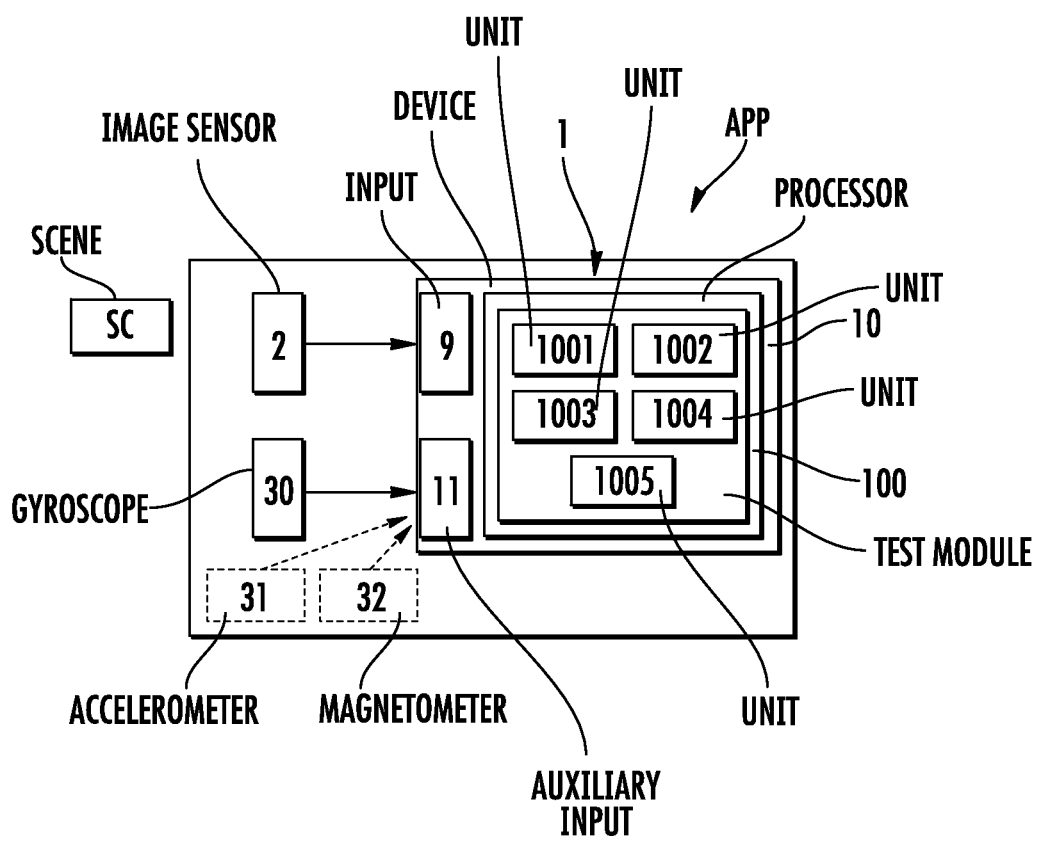
FIGS. 1 to 5 schematically illustrate implementations and embodiments of the invention.

In FIG. 1, the reference APP denotes an apparatus such as a mobile cellular telephone or a digital tablet, for example. These examples are for illustration purposes and are not to be restrictive. The apparatus APP comprises an image sensor 2, e.g., an embedded camera, for filming a scene SC.

The apparatus APP also comprises a device 1 for determining movement between successive video images captured by the image sensor 2. This device 1 may, for example, be incorporated within a microprocessor.

The device 1 comprises input means or an input 9 for receiving image signals relating to the video images of the scene SC successively captured by the image sensor 2, and auxiliary input means or an auxiliary input 11 for receiving auxiliary information originating, for example, from a gyroscope 30, and optionally one or more accelerometers 31, and/or a magnetometer 32.

The inertial sensors 30, 31 and 32 are, for example, rigidly connected to the apparatus APP in the same way as the image sensor. The inertial sensors therefore follow any movement in space of the image sensor 2. Accordingly, this auxiliary information is representative of a movement of the image sensor between the captures of two successive video images.

The device 1 comprises processing means or a processor 10 configured, as will be seen in more detail below, for performing for each current pair of first and second successive video images a determination of movement between these two images. In this respect, the processing means comprise test means or a test module 100 configured for testing a plurality of first homography model hypotheses of this movement, obtained from a set of points in the first image and of assumed corresponding points in the second image, and at least one second homography model hypothesis obtained from the auxiliary information.

The test module 100 comprises in this respect various means or units referenced 1001-1005 which will be returned to below with greater detail on their function. The processing means 10 and the means composing the same may be implemented in software within the microprocessor.

The various homography model hypotheses of the movement will be processed by a RANSAC type algorithm. Although the conventional RANSAC type algorithm may be used, an implementation will now be described using the Pre-emptive RANSAC type algorithm which is better suited for embedded applications, as is the case described here with reference to FIG. 1.

Generally speaking, the Pre-emptive RANSAC algorithm operates on successive blocks of a set of first points in the first image and first assumed corresponding points in the second image of a pair. The Pre-emptive RANSAC algorithm notably tests visual homography model hypotheses obtained from a set of second points in the first image and of second assumed corresponding points in the second image. However, in general, these second points are interest points of the image and the set of first (test) points may or may not intersect with the set of second (hypothesis generator) points.

Figure 2:
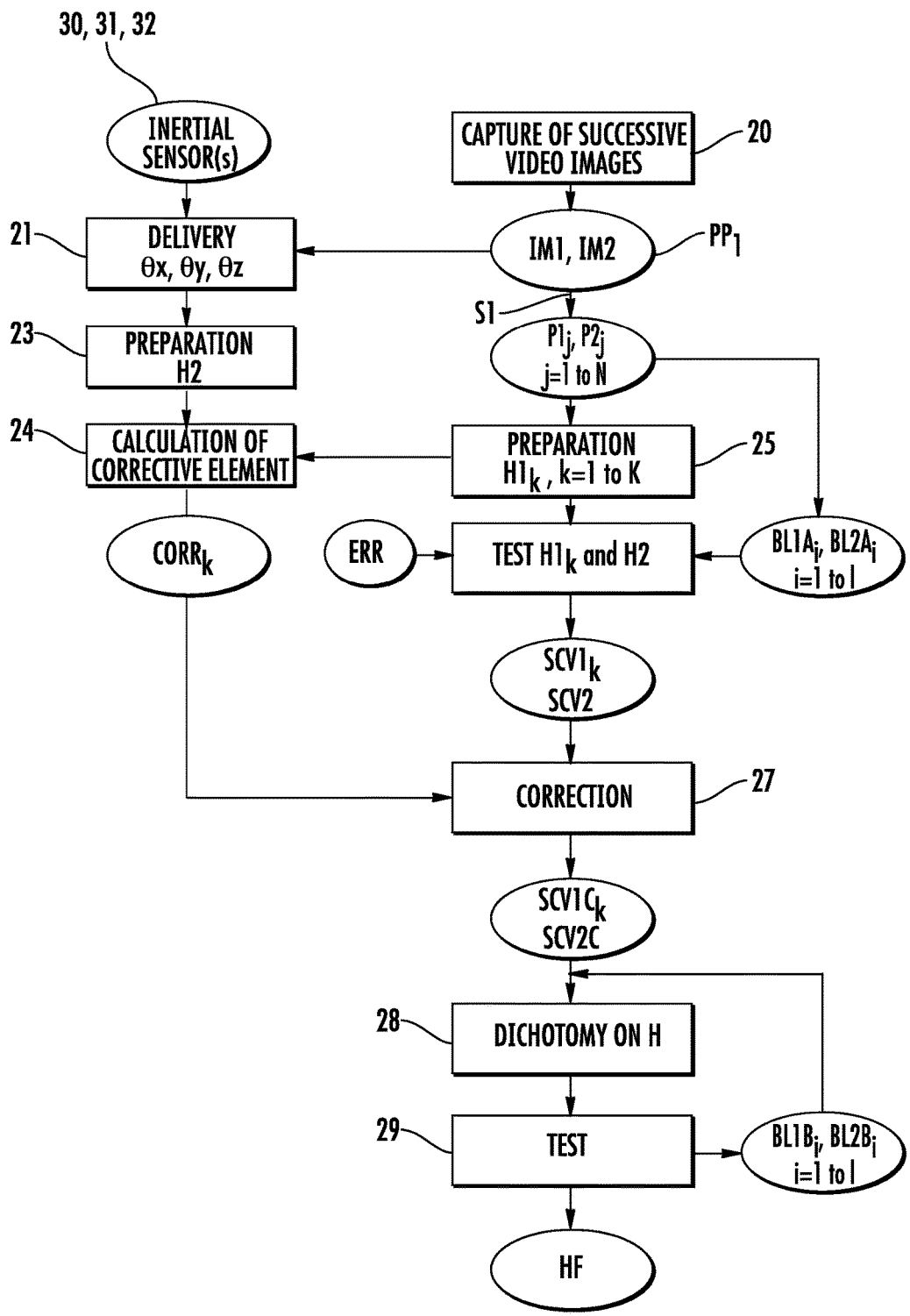

More particular reference is now made to FIG. 2 for describing an implementation of the method for determining movement between successive video images. In step 20, successive video images are captured and it is assumed here that a first video image IM1 and a second video image IM2 of a current pair of images PP$_i$ are captured.

The first image IM1 is typically the previous image and the second image IM2 the current image. This is followed by an extraction from the first image IM1 of N points or pixels P1$_j$, j=1 to N, and an extraction of N assumed corresponding points or pixels P2$_j$ from the second image IM2.

This extraction of interest points from an image and of assumed corresponding points from the next video image may be performed with algorithms known to the person skilled in the art. For example, one algorithm is known under the acronym FAST and described, for example, in the article by Edward Rosten and Tom Drummond titled "Machine learning for high-speed corner detection," ECCV 2006 Proceedings of the 9th European Conference on Computer Vision, Volume 1, Part 1, pages 430-443. Another algorithm is known under the acronym 'BRIEF' and described, for example, in the article by Michael Calonder et al. entitled 'BRIEF: Binary Robust Independent Elementary Features', ECCV 2010 Proceedings of the 11th European Conference on Computer Vision: Part IV, pages 778-792.

Triplets of points in the first image and triplets of assumed corresponding points in the second image are formed from these points P1$_j$ and P2$_j$. From these triplets (step 25) K first homography model hypotheses H1$_k$, k=1 to K of the global movement between the two images IM1 and IM2 are prepared.

These first homography model hypotheses are 3×3 homography matrices obtained, for example, using the DLT (Direct Linear Transform) algorithm described, for example, in the aforementioned essay by Elan Dubrofsky. These first model hypotheses H1$_k$ may be considered as visual model hypotheses since they are obtained from the pixels of the two successive images IM1 and IM2. As a guide, the number K of first model hypotheses H1$_k$ may be between 300 and 500.

Furthermore, the processing means 10 will prepare from the auxiliary information supplied by the gyroscope 30, and optionally the accelerometer or accelerometers 31 and/or magnetometers 32, a second homography model hypothesis H2 that may be designated as an inertial model hypothesis in that it is obtained directly from the auxiliary information delivered by the inertial sensor or sensors.

The types of cellular mobile telephones known as smartphones may be equipped with a gyroscope, an accelerometer and a magnetometer. The same applies to current digital tablets. It is assumed here that only a gyroscope is present.

The gyroscope integrates rotational speeds over the three axes between the capture of the two images and supplies the auxiliary information $\theta_x$, $\theta_y$ and $\theta_z$ which are the corresponding angles of rotation about the axes x, y and z representing yaw, pitch and roll, respectively. For preparing the inertial 3×3 homography matrix, the processing means must determine the horizontal $\Delta T_x$ and vertical translation $\Delta T_y$ and the angle of rotation in the plane resulting from the movement of the sensors between the two captured images IM1 and IM2.

In this regard, $\Delta T_x$ is given by the formula (1) below:

$$\Delta T_x = \theta_x \cdot \rho_x \qquad (1)$$

in which $\rho_x$ is a scaling factor defined by the formula (2) below:

$$\rho_x = L_x/2 \, \tan^{-1}(L_x/2f_x) \qquad (2)$$

Similarly, $\Delta T_y$ is defined by the formula (3) below:

$$\Delta T_y = \theta_y \cdot \rho_y \qquad (3)$$

in which $\rho_y$ is a scaling factor defined by the formula (4) below:

$$\rho_y = L_y/2 \, \tan^{-1}(L_y/2f_y) \qquad (4)$$

In formulae (2) and (4) $L_x$ and $L_y$ represent the resolution of the image, $f_x$ and $f_y$ the focal length and x and y refer respectively to the horizontal and vertical directions of the image.

The use of such scaling factors is well known to the person skilled in the art and for all useful purposes the latter may refer to the article by Suya You et al. titled "Hybrid inertial and vision tracking for augmented reality registration," Virtual Reality, 1999, Proceedings, IEEE 13-17 Mar. 1999, pages 260-267.

The roll angle $\theta_z$ directly supplies the planar rotation angle without needing a scaling factor.

The second (inertial) homography model hypothesis may then be represented by the 3×3 matrix H2 defined by the formula (5) below:

$$H2 = \begin{pmatrix} \cos\theta_z & \sin\theta_z & \Delta T_x \\ -\sin\theta_z & \cos\theta_z & \Delta T_y \\ 0 & 0 & 1 \end{pmatrix}. \qquad (5)$$

If the telephone is also equipped with accelerometer(s) and/or a magnetometer, the information supplied by the gyroscope is corrected, e.g., by filtering, in a known manner for supplying the auxiliary information.

Based on this, the calculation means or a calculation unit 1004 (FIG. 1) belonging to the test module 100 calculate (step 24, FIG. 2) a corrective element CORR$_k$ for each first model hypothesis H1$_k$ taking into account a distance between the hypothesis $H1_k$ and the second hypothesis H2. The calculation of these correction coefficients will be returned to in more detail below.

The test module 100 will then proceed with testing various homography model hypotheses, in this case the first hypotheses $H1_k$ and the second hypothesis H2. For this, given that the Pre-emptive RANSAC type algorithm is used, the test module randomly extracts from the set of points $P1_j$ a block of test points $BL1A_i$ and extracts from the set of points $P2_j$ the block of assumed corresponding points $BL2A_i$, with i varying from 1 to I. As a guide, I may be equal to 20.

In this first iteration, the testing of the various homography model hypotheses takes place on a block of 20 points taken at random from the image IM1 and on the block of assumed corresponding points in the IM2 image. At least some of these test points may or may not be taken from the points used in preparing the various model hypotheses.

For performing this test, first determination means or a first determination unit 1001 (FIG. 1) determines, for each point $BL1A_i$ of the block, an estimated point $BL1AS_i$ in the second image IM2, using the tested homography model hypothesis.

Then, second determination means or a second determination unit 1002 (FIG. 1) determines the position difference $e_{i,k}$ between the estimated point $BL1AS_i$ and the assumed corresponding point in the second image $BL2A_i$.

As a guide, this position difference $e_{i,k}$ corresponding to the number of pixels between the two points may be normalized according to the formula (6) below:

$$e_{i,k} = \|BL1AS_i - BL2Ai\| \quad (6)$$

in which the notation $\| \|$ represents the norm function.

Furthermore, third determination means or a third determination unit 1003 (FIG. 1) is configured for determining a first piece of score information $SCV1_k$ for the first hypotheses $H1_k$ and a first piece of score information $SCV2$ for the second homography model hypothesis H2, from the position differences obtained and an error tolerance. More precisely, at the start of the test, the pieces of score information $SCV1_k$ and $SCV2$ are initialized to 0.

Furthermore, whenever the position difference $e_{i,k}$ (for i=1 to I) associated with a hypothesis $H1_k$ is greater than a predefined error ERR, the corresponding piece of score information $SCV1_k$ remains unchanged, whereas it is updated by the formula (7):

$$SCV1_k = SCV1_k + 1 \quad (7)$$

if the position difference $e_{i,k}$ is less than or equal to said error ERR.

Updating the score information SCV2 associated with the model hypothesis H2 is performed in the same way.

Once the I points $BL1A_i$ have been processed, for each first homography model hypothesis $H1_k$ and for the second homography model hypothesis H2, the first updated pieces of score information $SCV1_k$ and $SCV2$ are therefore obtained. This can be described as visual score information since they have been obtained using the points contained in the two images IM1 and IM2. Then, the correction means or correction unit 1005 (FIG. 1) performs a correction of this visual score information using correction coefficients $CORR_k$. More precisely, for each first model hypothesis $H1_k$ a second piece of score information $SCV1C_k$ is obtained via the formula (8) below:

$$SCV1C_k = SCV1_k - CORR_k \quad (8)$$

The second piece of score information SCV2C associated with the inertial model hypothesis H2 is simply equal to the corresponding visual piece of score information SCV2 since the correction coefficient applied thereto is zero.

In a next step 28, the test module performs, for example, a dichotomy on the model hypotheses $H1_k$ and H2 which have just been tested. More precisely, the test module only keeps half of the tested model hypotheses which have had the highest second pieces of score information.

Then, the test module again performs a test 29 on these remaining model hypotheses using a new block of points $BL1B_i$ from the first image, drawn at random from the points not already tested, and the assumed corresponding block of points $BL2B_i$ from the second image IM2. The operations that have just been performed are repeated either until a single remaining model hypothesis HF is obtained, or until the tested points are exhausted.

In the first case, the remaining model hypothesis HF then represents the model of global movement between the two images IM1 and IM2. In the second case, the hypothesis HF that will be adopted is that which displays the highest second piece of score information.

Figure 3:
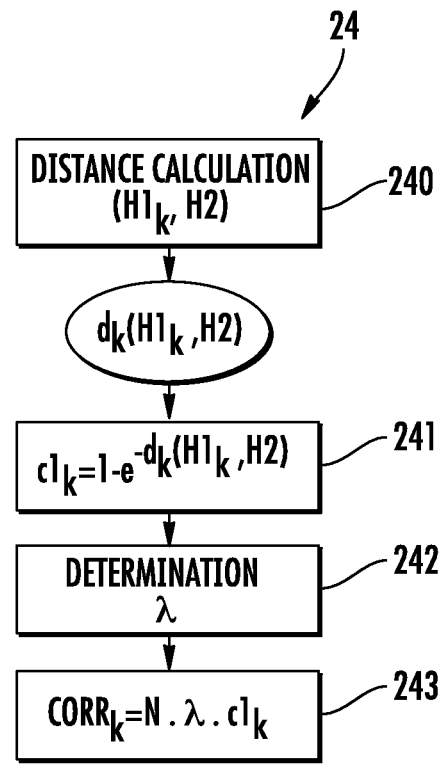
Figure 4:
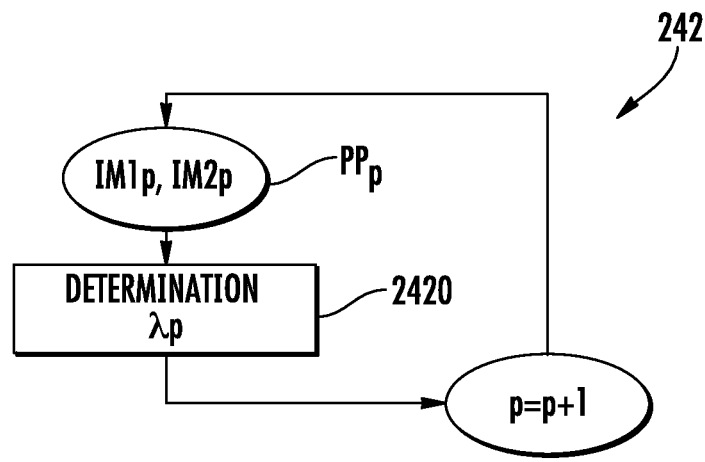
Figure 5:
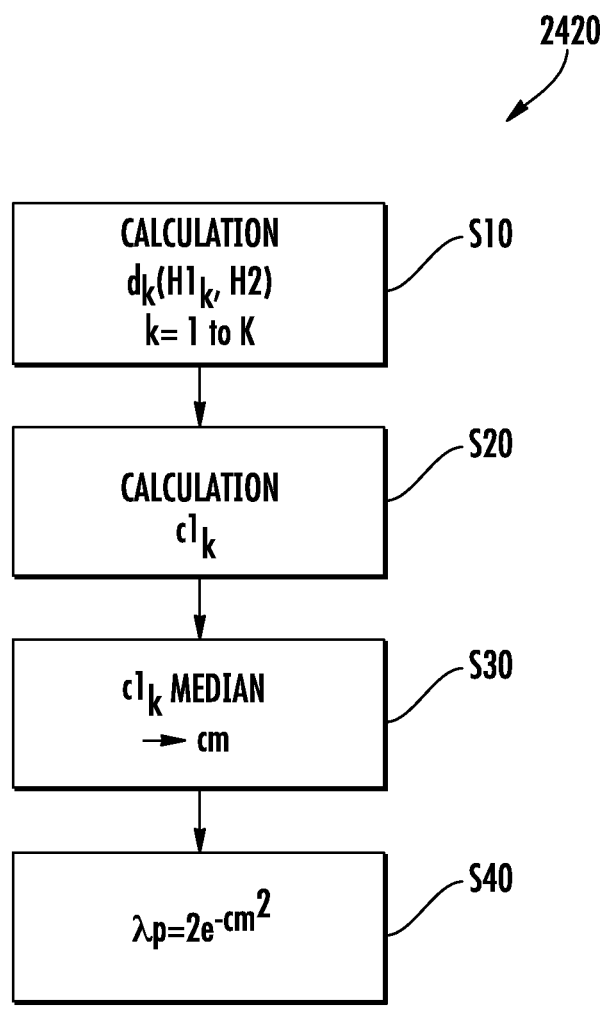

Reference is now made more particularly to FIGS. 3-5 for a more detailed description of examples of calculating correction coefficients $CORR_k$. More precisely, referring first to FIG. 3, it can be seen that the calculation means 1004 (FIG. 1) first calculates (step 240) the distance between the first homography model hypothesis considered $H1_k$ and the second homography model hypothesis H2.

The first homography model hypothesis $H1_k$ is a 3×3 matrix as defined by the expression (9) below:

$$H1_k = \begin{pmatrix} a1 & a2 & a3 \\ a4 & a5 & a6 \\ a7 & a8 & a9 \end{pmatrix}. \quad (9)$$

The matrix H2 is that illustrated by the formula (5) above. Since the two matrices have the same structure, the coefficients a3 and a6 of the matrix $H1_k$ respectively represent translations in x and y while the coefficient a2 represents the sine of the angle of rotation in the plane.

As a result, a particularly simple way of determining the distance $d_k$ ($H1_k, H2$) between the two model hypotheses is to use the formula (10) below:

$$d_k(H1_k, H2) = [(a3 - \Delta T_x)^2 + (a6 - \Delta T_y)^2 + (\arcsin(a2) - \theta_z)^2]^{1/2} \quad (10)$$

It should be noted, of course, that the distance d(H2,H2) is obviously zero. The calculation means then determine (step 241) a first coefficient ($c1_k$) defined by the formula (11) below:

$$c1_k = 1 - e^{d_k(H1_k, H2)} \quad (11)$$

in which e denotes the exponential function. Of course, the first coefficient associated with the second model hypothesis H2 is zero.

The calculation means then determine (step 242) a weighting coefficient $\lambda$ representative of a weight of the score information associated with the second homography model hypothesis H2 with respect to the score information associated with the tested homography model hypothesis $H1_k$ or H2. The manner of determining this weighting coefficient will be returned to in more detail below.

The calculation means then determine (step 243) the corrective element $CORR_k$ via the formula (12) below:

$$CORR_k = N \cdot \lambda \cdot c1_k \quad (12)$$

in which N denotes the number of points tested, i.e., the number of points $P1_j$ and the number of points $P2_j$ (j=1 to N), (FIG. 2).

The lower the weighting coefficient $\lambda$, the greater the weight of the visual score of the first model hypotheses $H1_k$ will be with respect to the inertial score of the inertial model hypothesis $H2$. Conversely, the higher the weighting coefficient $\lambda$, the less the weight of the visual score of the first model hypotheses $H1_k$ will be with respect to the inertial score of the inertial model hypothesis $H2$.

The person skilled in the art will be able to determine the weighting coefficient $\lambda$ according to the envisaged application. However, a fixed and constant value $\lambda$ equal to 1 for all the homography model hypotheses is a good compromise.

It is quite possible to keep this fixed and constant value $\lambda$ equally for all the successive image pairs. However, as a variation, in order to further improve the quality of the filmed video sequence, it is possible, as illustrated schematically in FIG. 4, for the determination 242 of the weighting coefficient $\lambda$ to be recalculated for each pair $PP_p$ of successive images $IM1_p$, $IM2_p$.

More precisely, for each current pair of images $PP_p$, the calculation means determine (step 242) the value of the weighting coefficient $\lambda_p$ which will, however, remain the same for all the tested model hypotheses associated with these two images of the current pair $PP_p$.

An example of calculating the weighting coefficient $\lambda_p$ is illustrated in FIG. 5. More precisely, the calculation means in step S10 calculates all the distances $d_k(H1_k, H2)$ for k=1 to K, between the first model hypotheses $H1$ and the second model hypothesis $H2$.

Then, the calculation means in step S20 calculate the first corresponding coefficients $c1_k$ (see step 241 in FIG. 3). The calculation means then extract the median coefficient referenced cm from all the first coefficients $c1_k$ (step S30).

The weighting coefficient $\lambda_p$ is then defined via the formula (13) below:

$$\lambda_p = 2e^{-cm^2} \quad (13)$$

Such a variable coefficient $\lambda_p$ between the various images makes it possible for the internal movement of an object within the image not to be too dominant with respect to the background. Thus, for example, when a truck passes through the field of the camera and occupies almost all this field, the stabilization of the image on the truck is minimized, thus minimizing or reducing the movement of the background.

Overall, the invention also makes it possible, for example, when a black dot is filmed in the center of a white wall, to only have a slight oscillation of the black dot due to the imprecision of the inertial sensor or sensors.

That which is claimed is:

1. A method of determining movement between successive video images captured by an image sensor comprises:
   determining movement between each current pair of first and second successive video images, the determining comprising
   testing a plurality of homography model hypotheses on the movement using a RANSAC type algorithm operating on a set of first points in the first video image and on first assumed corresponding points in the second video image so as to determine a selected homography model hypothesis that defines the movement, the testing comprising
   testing a plurality of first homography model hypotheses on the movement, each of the plurality of first homography model hypotheses being a matrix indicative of a global movement between the pair of first and second successive video images, each of the plurality of first homography model hypotheses being obtained from a set of second points in the first video image and second assumed corresponding points in the second video image; and
   testing at least one second homography model hypothesis obtained from auxiliary information supplied by at least one inertial sensor, the at least one second homography model hypothesis being a matrix representative of movement of the image sensor between the pair of first and second successive video images; and
   determining a corrective element comprising a first coefficient for each of the plurality of first homography model hypotheses, the corrective element of a respective first homography model hypotheses being dependent on a distance between the respective first homography model hypothesis and the at least one second homography model hypothesis.

2. The method according to claim 1, wherein the auxiliary information is supplied by at least one gyroscope.

3. The method according to claim 1, wherein the auxiliary information is supplied by a gyroscope and at least one other sensor, with the at least one other sensor comprising at least one of an accelerometer and a magnetometer.

4. The method according to claim 1, wherein the RANSAC type algorithm comprises a Pre-emptive RANSAC type algorithm.

5. The method according to claim 1, wherein the test for each homography model hypothesis includes for each first point of at least one block of the set of first points in the first image the following:
   determining a first estimated point in the second image from the tested homography model hypothesis;
   determining a position difference between the first estimated point and a first assumed corresponding point in the second image; and
   determining a first piece of score information from the position differences obtained and an error tolerance, and a correction of the first piece of score information with the corrective element, so as to obtain a second piece of score information, the second piece of score information being used for determining the selected homography model hypothesis.

6. The method according to claim 5, wherein determining the corrective element comprises determining a weighting of the first coefficient by a weighting coefficient representative of a weight of the first piece of score information associated with the at least one second homography model hypothesis with respect to the first piece of score information associated with the tested homography model hypothesis.

7. The method according to claim 6, wherein the weighting coefficient has a fixed and identical value for all the tested homography model hypotheses of all the video image pairs.

8. The method according to claim 6, wherein the weighting coefficient has a fixed and identical value for all the tested homography model hypotheses of the current pair of video images, with the value being calculated from all the values of respective distances between the tested homography model hypotheses of the current pair of images and the second homography model hypothesis, with the value being recalculated at each new current pair of video images.

9. The method according to claim 5, wherein determining the corrective element also takes into account the number of second points.

10. A device for determining movement between successive video images comprising:
a processor configured to receives image signals on video images successively captured by an image sensor, and for each current pair of first and second successive video images, determining movement therebetween, said processor comprising
a test module executing a RANSAC type algorithm and configured to test a plurality of homography model hypotheses of the movement using said RANSAC type algorithm operating on a set of first points in the first video image and first assumed corresponding points in the second image so as to deliver a selected homography model hypothesis defining the movement; and
an auxiliary input configured to receive auxiliary information from at least one inertial sensor, the auxiliary information being representative of a movement of said image sensor between the pair of first and second successive video images;
wherein said test module is configured to test a plurality of first homography model hypotheses of the movement, the plurality of first homography model hypotheses being a matrix indicative of a global movement between the first video image and the second video images, each of the plurality of first homography model hypotheses being obtained from a set of second points in the first video image and second assumed corresponding points in the second video image, and testing at least one second homography model hypothesis indicative of the auxiliary information, the test module being further configured to determine a corrective element comprising a first coefficient for each of the plurality of first homography model hypotheses, the corrective element of a respective first homography model hypotheses being dependent on a distance between the respective first homography model hypothesis and the at least one second homography model hypothesis.

11. The device according to claim 10, wherein the at least one inertial sensor comprises a gyroscope.

12. The device according to claim 10, wherein the at least one inertial sensor comprises a plurality of inertial sensors comprising at least one of a gyroscope, an accelerometer and a magnetometer.

13. The device according to claim 10, wherein said RANSAC type algorithm comprises a Pre-emptive RANSAC type algorithm.

14. The device according to claim 10, wherein said test module comprises:
a first determination unit configured to determine, for each first point of at least one block of the set of first points in the first video image, a first estimated point in the second video image from the tested homography model hypothesis;
a second determination unit configured to determine a position difference between the first estimated point and the first assumed corresponding point in the second video image;
a third determination unit configured to determine a first piece of score information from the position differences obtained and an error tolerance;
a calculation unit configured to calculate the corrective element; and
a correction unit configured to correct the first piece of score information with the corrective element so as to obtain a second piece of score information, with the second piece of score information being used for determining the selected homography model hypothesis.

15. The device according to claim 14, wherein said calculation unit is further configured to determine a weighting of the first coefficient by a weighting coefficient representative of a weight of the first piece of score information associated with the at least one second homography model hypothesis with respect to the first piece of score information associated with the tested homography model hypothesis.

16. The device according to claim 15, wherein the weighting coefficient has a fixed and identical value for all the tested homography model hypotheses of all the video image pairs.

17. The device according to claim 15, wherein the weighting coefficient has a fixed and identical value for all the tested homography model hypotheses of the current pair of video images, with said calculation unit being further configured to calculate the value from all the values of respective distances between the tested homography model hypotheses of the current pair of video images and the second homography model hypothesis, and for recalculating the value at each new current pair of video images.

18. The device according to claim 14, wherein said calculation unit is further configured to take into account the number of second points.

19. An apparatus comprising:
an image sensor configured to generate image signals based on successively captured video images;
at least one inertial sensor;
a device for determining movement between successive video images comprising
a processor configured to receives the image signals, and for each current pair of first and second successive video images, determining movement therebetween, said processor comprising
a test module comprising a RANSAC type algorithm and configured to test a plurality of homography model hypotheses of the movement using said RANSAC type algorithm operating on a set of first points in the first video image and first assumed corresponding points in the second image so as to deliver a selected homography model hypothesis defining the movement,
an auxiliary input configured to receive auxiliary information from said at least one inertial sensor, the auxiliary information being representative of a movement of said image sensor between the pair of first and second successive video images, and
said test module configured for testing a plurality of first homography model hypotheses of the movement obtained from a set of second points in the first video image and second assumed corresponding points in the second video image and at least one second homography model hypothesis obtained from the auxiliary information, wherein said test module comprises:
a first determination unit configured to determine, for each first point of at least one block of the set of first points in the first video image, a first estimated point in the second video image from the tested homography model hypothesis;
a second determination unit configured to determine a position difference between the first estimated point and the first assumed corresponding point in the second video image;

a third determination unit configured to determine a first piece of score information from the position differences obtained and an error tolerance;

a calculation unit configured to calculate a corrective element comprising a first coefficient taking into account a distance between the homography model hypothesis and the at least one second homography model hypothesis; and a correction unit configured to correct the first piece of score information with the corrective element so as to obtain a second piece of score information, with the second piece of score information being used for determining the selected homography model hypothesis.

20. The apparatus according to claim 19, wherein said at least one inertial sensor comprises a gyroscope.

21. The apparatus according to claim 19, wherein said at least one inertial sensor comprises a plurality of inertial sensors comprising at least one of a gyroscope, an accelerometer and a magnetometer.

22. The apparatus according to claim 19, wherein said RANSAC type algorithm comprises a Pre-emptive RANSAC type algorithm.

23. The apparatus according to claim 19, wherein said image sensor, said at least one inertial sensor, and said device are configured so that the apparatus is at least one of a mobile cellular telephone and a digital tablet.

\* \* \* \* \*